United States Patent
Yoon et al.

(10) Patent No.: US 8,811,519 B2
(45) Date of Patent: Aug. 19, 2014

(54) DATA TRANSMISSION METHOD AND APPARATUS IN MIMO COMMUNICATION SYSTEM

(75) Inventors: Seok Hyun Yoon, Gwangmyeong-si (KR); Chung Ku Yie, Incheon (KR); Min Sung Kim, Anyang-si (KR)

(73) Assignee: Humax Holdings Co., Ltd., Yongin-Si (KR)

( * ) Notice: Subject to any disclaimer, the term of this patent is extended or adjusted under 35 U.S.C. 154(b) by 0 days.

(21) Appl. No.: 13/580,346

(22) PCT Filed: Mar. 23, 2011

(86) PCT No.: PCT/KR2011/001986
§ 371 (c)(1),
(2), (4) Date: Aug. 21, 2012

(87) PCT Pub. No.: WO2011/122783
PCT Pub. Date: Oct. 6, 2011

(65) Prior Publication Data
US 2012/0328035 A1     Dec. 27, 2012

(30) Foreign Application Priority Data

Mar. 31, 2010   (KR) .................. 10-2010-0029459
Mar. 11, 2011   (KR) .................. 10-2011-0022069

(51) Int. Cl.
*H04B 7/02*       (2006.01)
*H04L 25/03*      (2006.01)
*H04B 7/06*       (2006.01)
*H04W 72/04*      (2009.01)
*H04L 5/00*       (2006.01)

(52) U.S. Cl.
CPC .............. *H04B 7/0626* (2013.01); *H04B 7/024* (2013.01); *H04L 25/03343* (2013.01); *H04L 5/0023* (2013.01); *H04B 7/0641* (2013.01); *H04L 5/0053* (2013.01); *H04L 2025/03426* (2013.01); *H04B 7/0639* (2013.01); *H04L 2025/03414* (2013.01); *H04W 72/0426* (2013.01); *H04W 72/0406* (2013.01); *H04L 2025/03802* (2013.01); *H04L 5/0057* (2013.01)
USPC ............ 375/267; 375/260; 375/262; 375/265

(58) Field of Classification Search
CPC ..... H04L 1/0618; H04L 1/06; H04L 25/0204; H04B 7/0417; H04B 7/0669
USPC .......... 375/267, 260, 262, 265; 370/203, 204, 370/205, 208, 209, 210
See application file for complete search history.

(56) References Cited

U.S. PATENT DOCUMENTS 8,233,426 B2 *   7/2012  Han et al. ...................... 370/318
8,315,324 B2 *  11/2012  Lee et al. ...................... 375/267

(Continued)

FOREIGN PATENT DOCUMENTS

KR      10-0936119 B1     12/2009
WO      WO 2008/053550 A1  5/2008
WO      WO 2009/026770 A1  3/2009

OTHER PUBLICATIONS

Liu et al., "Multi-cell MIMO Schemes for IEEE 802.16m," IEEE 802.16 Broadband Wireless Access Working Group, IEEE C802.16m-08/632, XP-17633505A, Jul. 7, 2008, pp. 1-8.

(Continued)

*Primary Examiner* — Dhaval Patel
(74) *Attorney, Agent, or Firm* — Birch, Stewart, Kolasch & Birch, LLP (57) ABSTRACT

A method and apparatus for efficiently transmitting data in an MIMO communication system are provided. The method includes receiving first Channel State Information (CSI) fed back from a plurality of terminals; requesting feedback of second CSI from the respective terminals, the second CSI differing from the first CSI; and determining the terminals to be grouped by using at least one of the first CSI and second CSI, when the second CSI is fed back from the respective terminals.

13 Claims, 3 Drawing Sheets

(56) References Cited

U.S. PATENT DOCUMENTS

2005/0032522 A1*  2/2005  Soong et al. ............... 455/450
2007/0223423 A1   9/2007  Kim et al.
2008/0009302 A1   1/2008  Cho et al.
2009/0006925 A1   1/2009  Pan
2010/0034108 A1   2/2010  Ode
2010/0103832 A1   4/2010  Zhou et al.
2011/0200131 A1*  8/2011  Gao et al. .................. 375/267

OTHER PUBLICATIONS

Srinivasan et al., "Updates to the IEEE 802.16m System Description Document (SDD)," IEEE 802.16 Broadband Wireless Access Working Group, IEEE 802.16m-10/0651r3, XP-17794927A, May 13, 2010, 145 pages.

Yonggang et al., "Discussion on Technologies for E-MBS," IEEE 802.16 Broadband Wireless Access Working Group, IEEE C80216m-08/1134, XP-17791750A, Sep. 5, 2008, pp. 1-14.

* cited by examiner

DATA TRANSMISSION METHOD AND APPARATUS IN MIMO COMMUNICATION SYSTEM

CROSS-REFERENCE TO RELATED APPLICATIONS

This application is the National Stage of PCT/KR2011/001986 filed on Mar. 23, 2011, which claims benefit to Korean Application No. 10-2010-0029459 filed in the Republic of Korea, on Mar. 31, 2010 and Korean Application No. 10-2011-0022069 filed in the Republic of Korea, on Mar. 11, 2011. The entire content of all of the above applications is hereby incorporated by reference.

TECHNICAL FIELD

The present invention relates to a wireless communication system, and more particularly, to a data transmission method and apparatus in a Multi-Input Multi-Output (MIMO) communication system.

BACKGROUND ART

A next-generation mobile communication and wireless transmission system requires an enhanced data transmission rate and an enhanced system capacity in a multi-cell environment. To satisfy such requirements, research is being conducted on an MIMO system that transmits data using a plurality of antennas, and a closed-loop MIMO system that uses channel state information for enhancing a data transmission rate in the multi-cell environment enhances transmission performance by using the channel state information.

Generally, in the MIMO system, terminals can know channel state information on a reception channel by using received data, but base stations cannot know the channel state information. Therefore, in order to enhance system performance by using the channel state information, base stations need to know the channel state information.

In a system using a closed-loop MIMO, data is transmitted by using information on respective transmission channels for terminals that receive a service from the base stations. In this case, the base stations cannot know information on respective transmission channels for the terminals that receive a service from the base stations, and thus receive channel information (for example, Channel Quality Indicator (CQI), Precoding Matrix Index (PMI), etc.) that is fed back from the terminals.

A terminal estimates a channel through which data is received, by using a signal received from a base station. The terminal calculates CQI with the estimated channel in order for the base station to apply a Modulation Coding Scheme (MCS) suitable for a channel condition when transmitting data. Also, the terminal selects a channel coefficient (i.e., a precoding vector of a codebook) most suitable for the channel condition from a priori codebook by using the estimated channel and the codebook. Channel state information, which the terminal has calculated with the estimated channel, is transmitted through a feedback channel between the base station and the terminal. The base station transmits data to the terminal by using the channel information received from the terminal, a selected MCS and the precoding vector of the codebook.

Much research is being presently conducted on the closed-loop MIMO system, and a closed-loop MIMO scheme is being applied and used even in a multi-cell environment as well as a single cell environment. However, research is inadequate on a method for reducing the influence of interference from different cells in the multi-cell environment.

Especially, a terminal located at the edge of a cell receives a weak signal from a base station for a cell in which the terminal is located, and thus, a base station for a neighbor cell experiences interference due to a terminal located in the neighbor cell. Due to this inter-cell interference, a terminal located at the edge of a cell is degraded in performance.

DISCLOSURE

Technical Problem

Accordingly, the present invention is directed to provide a data transmission method and apparatus in an MIMO communication system that substantially obviate one or more problems due to limitations and disadvantages of the related art.

An aspect of the present invention is directed to provide a method and apparatus for efficiently transmitting data in an MIMO communication system.

Another aspect of the present invention is directed to provide a data transmission method and apparatus in an MIMO communication system, which can efficiently mitigate interference between multi users.

Another aspect of the present invention is directed to provide a data transmission method and apparatus in an MIMO communication system, which mitigate interference between multi users, thus enhancing the transmission rates of terminals located at a cell boundary.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these and other advantages and in accordance with the purpose of the invention, as embodied and broadly described herein, there is provided a data transmission method in a Multi-Input Multi-Output (MIMO) communication system, the data transmission method including: receiving first Channel State Information (CSI) fed back from a plurality of terminals; requesting feedback of second CSI from the respective terminals, the second CSI differing from the first CSI; and determining the terminals to be grouped by using at least one of the first CSI and second CSI, when the second CSI is fed back from the respective terminals.

Each of the first and second CSI may include at least one Precoding Matrix Index (PMI).

In the determining the terminals, the terminals, which have fed back the same CSI among the first CSI fed back from the respective terminals, are determined as the terminals to be grouped, the terminals, which have fed back the same CSI among the second CSI fed back from the respective terminals, are determined as the terminals to be grouped, or the terminals, which have fed back the same CSI among the first CSI and second CSI, are determined as the terminals to be grouped.

Each of the first CSI is N number of upper CSI in which influence of an interference signal on a corresponding terminal is minimized among all CSI usable by the terminals. Each of the second CSI is N number of upper CSI in which influence of an interference signal on a corresponding terminal is minimized among a plurality of CSI other than the first CSI.

The data transmission method may further include determining the terminals to be grouped by using the first CSI, before the requesting feedback of the second CSI. The requesting feedback of the second CSI is performed when there are no terminals to be grouped by using the first CSI. The terminals, which have fed back the same CSI among the first CSI fed back from the respective terminals, are determined as the terminals to be grouped when determining the terminals to be grouped by using the first CSI.

The receiving of first CSI, the requesting feedback of the second CSI, and the determining the terminals to be grouped are repeated predetermined times or until there are terminals to be grouped.

In another aspect of the present invention, there is provided a data transmission method in an MIMO communication system including: estimating a channel between a base station and a terminal; feeding back a first Precoding Matrix Index (PMI) to the base station according to the estimated result, the first PMI being N number of upper PMIs in which influence of an interference signal is minimized among a plurality of usable PMIs; and feeding back a second PMI to the base station according to the estimated result, the second PMI being N number of upper PMIs in which influence of an interference signal is minimized among a plurality of PMIs other than the first PMI.

The second PMI may be fed back when a feedback request for the second PMI is received from the base station.

The feedback request for the second PMI may be received from the base station when it is determined that there are no terminals to be grouped.

The feedback request for the second PMI may be received from the base station when there are no terminals which have been fed back the same PMI among the first PMIs, there are no terminals which have been fed back the same PMI among the second PMIs, or there are no terminals which have been fed back the same PMI among the first PMIs and the second PMIs.

In another aspect of the present invention, there is provided a data transmission method in an MIMO communication system including: estimating a channel between a base station and a terminal; and selecting a first Precoding Matrix Index (PMI) and a second PMI according to the estimated result to feed back the selected first PMI and the second PMI to the base station when a Channel Quality Indicator (CQI) report type for the base station is one of a wideband CQI report type and a User Equipment (UE) selected subband CQI report type, the first PMI being a PMI for a channel between the terminal and the base station.

The wideband CQI report type may be a type in which single CQI value for an entire system band is fed back, and the UE selected subband CQI report type may be a type in which an average CQI value for a plurality of subbands selected by a terminal is fed back.

The first PMI may be N number of upper PMIs in which influence of an interference signal is minimized among a plurality of PMIs usable according to the estimated result, and the second PMI may be N number of upper PMIs in which influence of an interference signal is minimized among a plurality of PMIs other than the first PMI.

The first and second PMIs may be sequentially transmitted to the base station.

In another aspect of the present invention, there is provided a computer-readable record medium storing a program for executing any one of the methods.

In another aspect of the present invention, there is provided a data transmission apparatus in an MIMO communication system including: a processor configured to estimate a channel between a base station and a terminal, and select a first Precoding Matrix Index (PMI) and a second PMI according to the estimated result when a Channel Quality Indicator (CQI) report type is a type in which single CQI value for an entire system band is fed back or a type in which an average CQI value for a plurality of subbands selected by a terminal is fed back; and an RF unit configured to transmit the first and second PMIs transferred from the processor and uplink data to the base station, or receive downlink data to transfer to the processor, the uplink data being transmitted from the terminal to the base station and the downlink data being transmitted from the base station to the terminal.

The processor may select N number of upper PMIs in which influence of an interference signal is minimized among a plurality of usable PMIs according to the estimated result as the first PMI, and select N number of upper PMIs in which influence of an interference signal is minimized among a plurality of PMIs other than the first PMI as the second PMI. The RF unit may sequentially transmit the first and second PMIs to the base station.

In another aspect of the present invention, there is provided a data transmission apparatus in an MIMO communication system including: a processor configured to determine whether Precoding Matrix Indexes (PMI) which is respectively fed back from a plurality of terminal is matched, group a plurality of terminals which have fed back the same PMI to precode downlink data to be transmitted to each of the terminals with a precoding matrix selected by using a corresponding PMI when the PMIs are matched, and generate a PMI retransmission request for each terminal when the PMI is not matched; and an RF unit configured to receive the PMI which is fed back from each terminal, and transmit the downlink data or the PMI retransmission request to each terminal or receive uplink data from each terminal.

The PMI, which is fed back from each terminal, may be N number of upper PMIs in which influence of an interference signal is minimized among a plurality of PMIs usable according to a channel-estimated result between each terminal and a base station.

It is to be understood that both the foregoing general description and the following detailed description of the present invention are exemplary and explanatory and are intended to provide further explanation of the invention as claimed.

Advantageous Effects

According to the present invention, by using a plurality of PMIs respectively transmitted from a plurality of terminals that configure the MIMO communication system, data can be more efficiently transmitted.

Moreover, according to the present invention, interference between multi users in a multi-cell or single cell can be efficiently mitigated by effectively grouping a plurality of terminals.

Moreover, according to the present invention, the transmission rates of terminals located at a cell boundary can be enhanced by mitigating interference between multi users.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR INVENTION

In the below description, for convenience of a description, a user and a terminal are used as the same concept, and a cell and a base station are used as the same concept.

In the specification, a description is made for exemplary embodiments of the present invention, and is not made for a single embodiment of the present invention. Also, in the below description, a description on a known structure or apparatus may not be provided for avoiding the ambiguousness of the core features of the present invention.

Moreover, in the below-described embodiments, each element or feature should be considered to be selective unless there is no clear statement. Therefore, each element or feature may be embodied without being combined with another element or feature, or the embodiments of the present may be configured by combing some elements or features. Also, in the embodiments of the present invention, the order of described operations may be changed, and some elements or features in a specific embodiment may be included in another embodiment or replaced with a corresponding element or feature in another embodiment.

Embodiments of the present invention will be described on a data transmission and reception relationship between a base station and a terminal. Here, the base station denotes a terminal node of a network that performs communication directly with the terminal. In the specification, a specific operation that is described as being performed by the base station may be performed by an upper node of the base station, depending on the case. That is, various operations, which are performed for communication with the terminal over a network configured with a plurality of network nodes including the base station, may be performed by the base station or the other network nodes other than the base station. The base station may be replaced by a term such as a fixed station, an Node B, an eNode B (eNB), or an access point, and the terminal may be replaced by a term such as user equipment (UE), a mobile station (MS), a mobile subscriber station (MSS).

Moreover, a data transmission method and apparatus according to the present invention may be applied to various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

The wireless access technologies may be implemented as various wireless communication standard systems. For example, wideband CDMA (WCDMA) may be implemented as wireless technology such as Universal Terrestrial Radio Access Network (UTRAN) according to 3rd Generation Partnership Project (3GPP) standard organization. Also, CDMA2000 is CDMA-based wireless technology, and High Rate Packet Data (HRPD) according to 3rd Generation Partnership Project 2 (3GPP2) standard organization is wireless technology that provides a high packet data service in a CDMA2000-based system. evolved HRPD (eHRPD) is wireless technology in which HRPD has been advanced, and TDMA may be implemented as wireless technology such as Global System for Mobile communications (GSM)/General Packet Radio Service (GPRS)/Enhanced Data Rates for GSM Evolution (EDGE). OFDMA may be implemented as wireless technology such as IEEE 802.11 (Wi-Fi), IEEE 802.16 (WiMAX), IEEE 802-20, or EUTRAN (Evolved-UTRAN). Long Term Evolution (LTE) is a portion of Evolved-UMTS (E-UMTS) using E-UTRAN. LTE applies OFDMA in a downlink, and applies Single Carrier Frequency Division Multiple Access (SC-FDMA) in an uplink. LTE-Advanced (LTE-A) is wireless technology in which LTE has been advanced.

The MIMO system, to which present invention is applied, is a system that uses multi transmission antennas and at least one reception antenna. The present invention may be applied to various MIMO schemes. In the MIMO schemes, there are a spatial diversity scheme that transmits the same stream through multi layers, and a spatial multiplexing scheme that transmits a multi-stream through multi layers. In the spatial multiplexing scheme, a multi-stream being transmitted to one user denotes Single User-MIMO (SU-MIMO) or Spatial Division Multiple Access (SDMA). In the spatial multiplexing scheme, a multi-stream being transmitted to multi users denotes Multi User-MIMO (MU-MIMO). Also, each of the spatial diversity scheme and the spatial multiplexing scheme may be categorized into an open-loop scheme and a closed-loop scheme according to whether to use feedback information that is reported from users.

Hereinafter, embodiments of the present invention will be described in detail with reference to the accompanying drawings.

Figure 1:
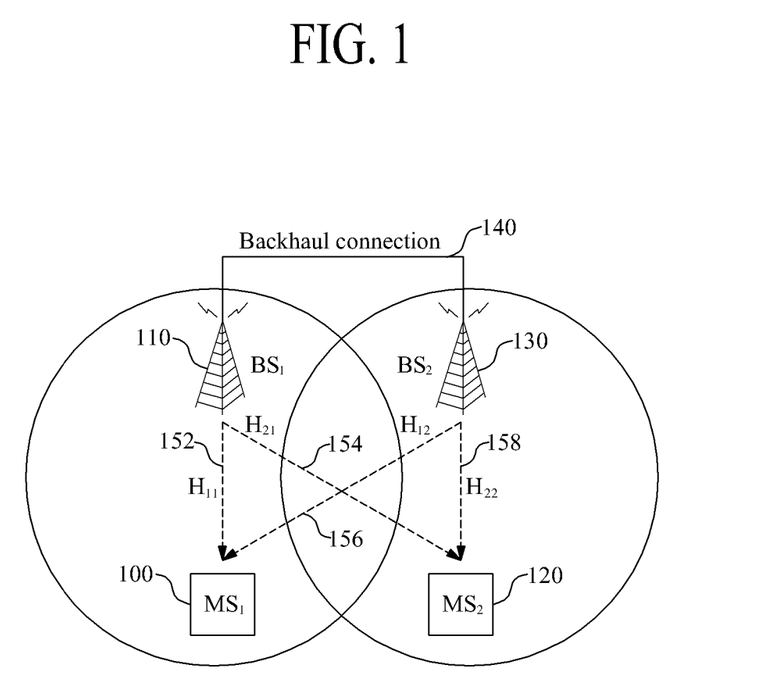
FIG. 1 is a diagram schematically illustrating a system model in a multi-cell environment to which the present invention is applied.

FIG. 1 is a diagram illustrating a model of a multi users-based MIMO communication system to which the present invention is applied. The model of FIG. 1 is a system model for cooperation beam forming in cellular downlink transmission based on multi antennas. In FIG. 1, for convenience for a description, a two-cell system model is assumed, but the present invention may be applied even to a two or more-cell system or a single cell-based system.

As illustrated in FIG. 1, an anchor cell of an MS1 (hereinafter referred to as a first terminal 100) is a BS1 (hereinafter referred to as a first base station 110), and an anchor cell of an MS2 (hereinafter referred to as a second terminal 120) is a BS2 (hereinafter referred to as a second base station 130).

When the first terminal 100 and the second terminal 120 are located adjacently to each other, the first terminal 100 is affected by a signal (interference signal) from the second base station 130 as well as a signal from the first base station 110 that is an anchor cell of the first terminal 100, and the second terminal 120 is affected by a signal (interference signal) from the first base station 120 as well as a signal from the second base station 130 that is an anchor cell of the second terminal 120.

In this case, the first base station 110 and the second base station 130 select an appropriate precoding matrix, and thus minimize inter-cell interference and enhance the transmission rates of the terminals 110 and 120 that are respectively managed by the first base station 110 and the second base station 130.

In the system of FIG. 1, cooperation beam forming is performed through the following two operations.

First, the first terminal 100 feeds back Channel State Information (CSI) on the first base station 110 (which is the anchor cell of the first terminal 100) and CSI on the second base station 130 (which is an interference cell) to the first base station 110 that is the anchor cell of the first terminal 100.

Moreover, the second terminal 120 feeds back CSI on the second base station 130 (which is the anchor cell of the second terminal 120) and CSI on the first base station 110 (which is an interference cell) to the second base station 130 that is the anchor cell of the second terminal 120.

Here, the CSI denotes information that indicates a channel state of a transmission link (for example, downlink) and the CSI is obtained by measuring a reference signal in the terminal. In an embodiment, CSI may be indirect CSI based on implicit feedback including at least one of a Rank Index (RI), a PMI, and CQI.

The CQI indicates an MCS level suitable for a channel, and may be reported aperiodically or periodically.

The first and second base stations 110 and 130 located in a cluster shares CSI, data, and scheduling information through a backhaul connection 140, and select a precoding matrix on the basis of shared information.

In selecting the precoding matrix, the base stations 110 and 130 use respective CSI that are fed back from the terminals 100 and 120, in which case mismatching can occur between CSIs which are fed back from the first and second terminal 100 and 120 to the first and second base station 110 and 130, respectively.

For example, in the system model of FIG. 1, a first channel (H11) 152 that is a channel between the first terminal 100 and the first base station 110 may differ from a second channel (H21) 154 that is a channel between the second terminal 120 and the first base station 110, and a third channel (H12) 156 that is a channel between the first terminal 100 and the second base station 130 may differ from a fourth channel (H22) 158 that is a channel between the second terminal 120 and the second base station 130.

In such an environment, when the first terminal 100 estimates the first channel 152 to request the use of PMI_1 from the first base station 110 and estimates the third channel 156 to request the use of PMI_2 from the second base station 130, and the second terminal 120 estimates the second channel 154 to request the use of PMI_3 from the first base station 110 and estimates the fourth channel 158 to request the use of PMI_4 from the second base station 130, the first base station 110 and the second station 130 receive mutually contradicted requests from the terminals 100 and 120, respectively, and thus, it is unable to select a PMI.

When the number of terminals increases, the same PMI is reported from different terminals, and thus, by grouping terminals that report the same PMI, the terminals may simultaneously get a service through different layers with the same PMI. However, as the selection width of a precoder becomes broader, a probability that the terminals simultaneously get a service through different layers can become greatly lower.

Therefore, to solve mismatching of CSIs (for example, PMI) in a multi-user environment, each terminal sequentially transmits preference CSI to a base station thereof, and thus, the present invention enables each base station to select a precoding matrix, which is capable of minimizing inter-cell interference, by using a plurality of transmitted CSI.

Hereinafter, a data transmission method in the MIMO communication system under the multi-cell environment according to the present invention will be described in detail with reference to FIG. 2.

Figure 2:
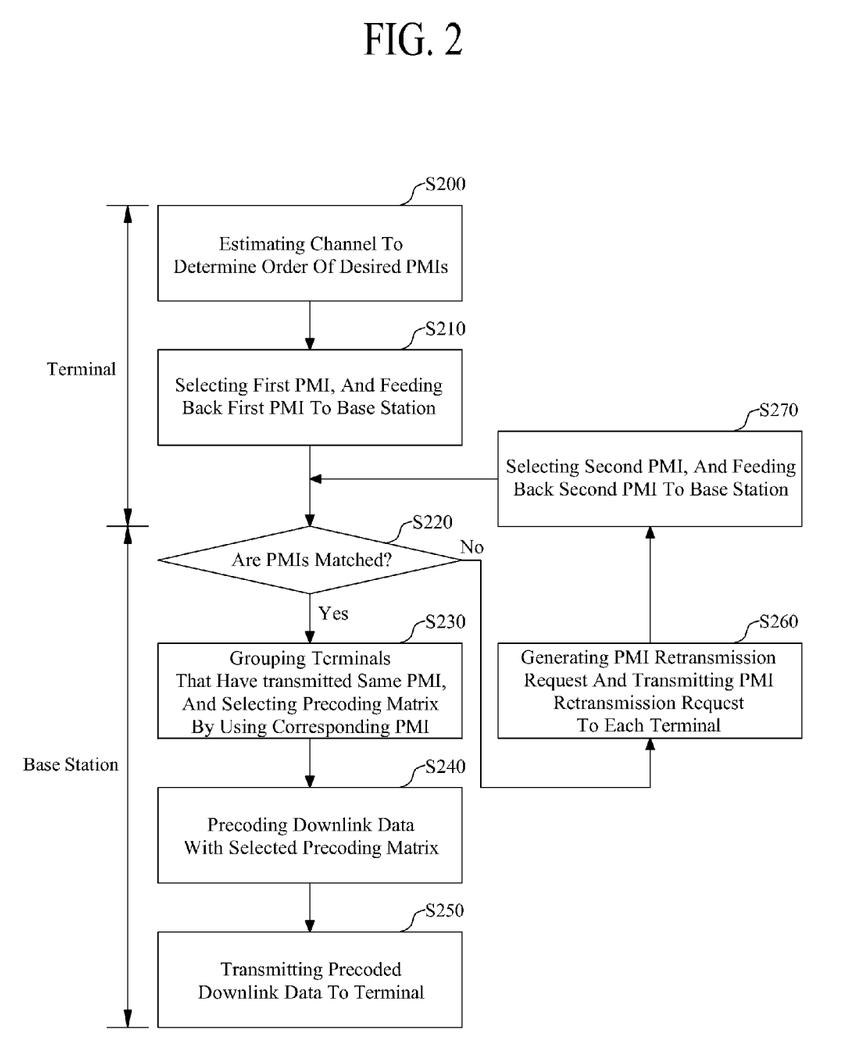
FIG. 2 is a flowchart illustrating a data transmission method in an MIMO communication system under the multi-cell environment, according to an embodiment of the present invention.

As illustrated in FIG. 2, each terminal estimates a channel between each terminal and a base station to determine the order of CSI that each base station desires to use, in operation S200. In an embodiment, the order of CSI that each base station desires to use may be an order in which the influence of an interference signal becomes the minimum, and CSI may be a PMI. In the following description, for convenience of a description, CSI is assumed as a PMI.

Subsequently, each terminal selects an optimal first PMI from among a plurality of PMIs according to the order that has been determined in operation S200, and feeds back the optimal first PMI to the anchor base station of each terminal in operation S210. Here, the optimal first PMI may be N number of upper PMIs according to an order in which the influence of an interference signal decreases.

In an embodiment, only when a CQI report type is a wideband CQI report type or a User Equipment (UE) selected subband CQI report type, each terminal may feed back a plurality of PMIs to the anchor base station of each terminal.

Here, the wideband CQI report type denotes a type in which singleone CQI value for an entire system band is fed back. Such a type is for support of a Distributed Resource Block (DBR). In the DBR, a specific resource block cannot have channel quality far better than that of the other resource blocks because subcarriers used in actual transmission are spread over an entire band, and thus, single CQI value for an entire system band is fed back.

The UE selected subband CQI report type denotes a type in which a terminal estimates the channel quality of each subband, selects a plurality of subbands having good quality, and feeds back an average CQI value for the selected subbands. Such a type is for support of a Localized Resource Block (LBR). In the LBR, some neighbor resource blocks configure one subband, and CQI varies according to which of subbands is selected, whereby an average CQI for each subband is fed back by user's selecting a plurality of subbands having good quality.

Subsequently, each base station determines whether PMIs that are fed back from the respective terminals are matched in operation S220. Here, the determination of matching between the PMIs denotes determining whether there are terminals that have fed back the same PMI.

When it is determined in operation S220 that the PMIs are matched, each base station groups terminals which transmit the same first PMI) as same group, and selects a precoding matrix by using the first PMI in operation S230. Subsequently, each base station precodes downlink data, which will be transmitted to each terminal, by using the selected precoding matrix in operation S240, and transmits the precoded downlink data to respective terminals through a plurality of antennas in operation S250.

When it is determined in operation S220 that there is no terminals which transmit same PMI, namely, when mismatching between PMIs occurs, each base station generates a PMI retransmission request that requests the report of a suboptimal PMI from each terminal, and transmits the PMI retransmission request to each terminal in operation S260.

Subsequently, when the PMI retransmission request is received from a base station, each terminal selects a second PMI (which is a suboptimal PMI) from among a plurality of PMIs other than the first PMI, which has been previously fed back, according to the order that has been determined in operation S200 in response to the PMI retransmission request in operation S270. In an embodiment, the second PMI may be N number of upper PMIs according to the order in which the influence of an interference signal decreases among the PMIs other than the first PMI.

Subsequently, in response to the PMI retransmission request, when a PMI is fed back from each terminal, each base station repeats the above-described operations 220 to S250.

In an embodiment, the above-described operations 220 to S250 may be repeatedly performed predetermined times or until PMIs are matched.

In the above-described embodiment, it has been described above that when mismatching between PMIs occurs, each base station requests retransmission of a PMI, and when a PMI is retransmitted from each terminal in response to the request, each base station determines whether the retransmitted PMIs are matched. However, in a modified embodiment, each base station may store a PMI that is fed back from each terminal, and determine whether a retransmitted PMI is matched with a PMI that has been fed back before a predetermined time.

Also, in the above-described embodiment, it has been described above that when mismatching between PMIs occurs, each base station requests retransmission of a PMI. However, in a modified embodiment, each base station may request retransmission of a PMI irrespective of whether mismatching between PMIs occurs.

In another embodiment, when a CQI report type is a wideband CQI report type or a US selected subband CQI report type, each terminal may sequentially transmit a PMI to each base station according to a predetermined order irrespective of the PMI retransmission request, and each base station may select terminals to be grouped, by using PMIs that are sequentially received from respective terminals.

In the above-described embodiments, it has been described above that the present invention is applied for mitigating interference between multi users in the multi-cell environment, namely, for mitigating inter-cell interference in the multi-cell environment.

Figure 3:
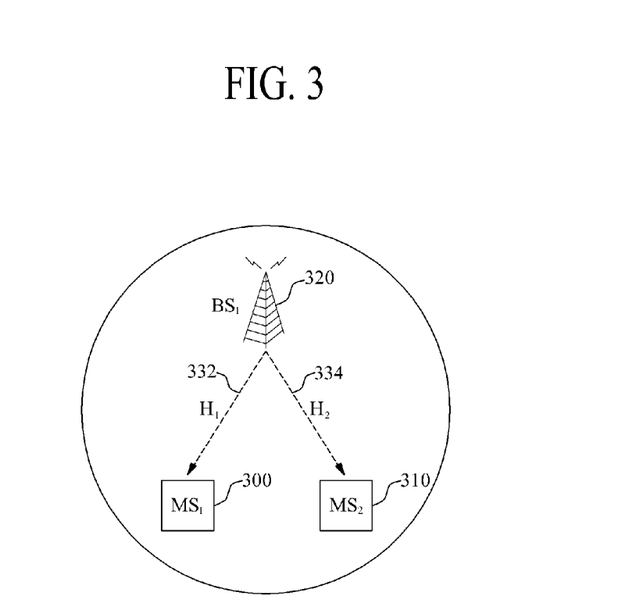
FIG. 3 is a diagram schematically illustrating a system model in a single cell environment according to another embodiment of the present invention.

However, the present invention may be applied even for mitigating interference between multi users in a single cell. That is, as illustrated in FIG. 3, an anchor cell of a first terminal (MS1) 300 and a second terminal (MS2) 310 is a first base station (BS1) 320, and the first terminal 300 and the second terminal 310 are affected by a signal (interference signal) of another terminal other than a signal thereof, in the same anchor cell.

In such an environment, a first channel (H1) 332 that is a channel between the first terminal 300 and the first base station 320 may differ from a second channel (H2) 334 that is a channel between the second terminal 310 and the first base station 320.

In this case, the first base station 320 selects an appropriate precoding matrix by using PMIs that are respectively fed back from the first terminal 300 and the second terminal 310, and thus minimizes interference between multi users in the single cell and enhances the transmission rates of the terminals 300 and 310. However, similarly to a case where interference between multi users is mitigated in the above-described multi-cell environment, mismatching between PMIs can occur.

Therefore, to solve mismatching between PMIs in a multi-user environment in the single cell, the first and second terminals 300 and 310 sequentially transmit preference PMIs to the first base station 320 that is the anchor cell thereof, and the first base station 320 selects a precoding matrix, which is capable of minimizing interference between multi users in the single cell, by using PMIs transmitted from respective terminals.

Specifically, each terminal estimates a channel between each terminal and an anchor base station to determine the order of CSI that the anchor base station desires to use. In an embodiment, the order of CSI that each base station desires to use may be an order in which the influence of an interference signal becomes the minimum, and CSI may be a PMI. In the following description, for convenience of a description, CSI is assumed as a PMI.

Subsequently, each terminal feeds back a first PMI, which allows the influence of an interference signal to decrease and are N number of upper PMIs, among a plurality of PMIs to a base station according to a the determined order.

Subsequently, the anchor base station determines whether PIMs that are fed back from respective terminals are matched, and when the PMIs are matched, the anchor base station groups terminals (which have fed back the same PMI) as same group, selects a precoding matrix by using a corresponding PMI, precodes data to be transmitted to each terminal with the precoding matrix, and transmits the precoded data to respective terminals through a plurality of antennas.

When mismatching between PMIs occurs (i.e., when terminals have fed back different PMIs), the anchor base station requests the report of a suboptimal PMI among a plurality of PMIs other than the first PMI from each terminal (hereinafter referred to as a PMI retransmission request)

When the PMI retransmission request is received, each terminal feeds back a second PMI, which is N number of upper PMIs according to an order (in which the influence of an interference signal decreases) among a plurality of PMIs other than the first PMI that has been previously fed back according to a request, to the anchor base station.

Subsequently, when the second PMI is fed back from each terminal, the anchor base station again determines whether PIMs that are fed back from respective terminals are matched, and when the PMIs are matched, the anchor base station groups terminals (which have fed back the same second PMI) as same group, selects a precoding matrix by using a corresponding second PMI, precodes data to be transmitted to each terminal with the precoding matrix, and transmits the precoded data to respective terminals through a plurality of antennas.

When the second PMIs are not matched, the above-described operations which are request of PMI retransmission and the retransmission of PMI are repeated. At this point, the repeated operation may be performed predetermined times or until the second PMIs are matched.

In the above-described embodiment, it has been described above that when mismatching between PMIs occurs, the anchor base station requests retransmission of a PMI, and when a PMI is retransmitted from each terminal in response to the request, the anchor base station determines whether the retransmitted PMIs are matched. However, in a modified embodiment, the anchor base station may store a PMI that is fed back from each terminal, and determine whether a retransmitted PMI is matched with a PMI that has been fed back before a predetermined time.

Also, in the above-described embodiment, it has been described above that when mismatching between PMIs occurs, the anchor base station requests retransmission of a PMI. However, in a modified embodiment, the anchor base station may request retransmission of a PMI irrespective of whether mismatching between PMIs occurs.

In another embodiment, when a CQI report type is a wideband CQI report type or a UE selected subband CQI report type, each terminal may sequentially transmit a PMI to each base station according to a predetermined order irrespective of the PMI retransmission request, and each base station may select terminals to be grouped, by using PMIs that are sequentially received from respective terminals.

Next, a base station and a terminal according to the present invention for performing the above-described method will be described in detail with reference to FIG. 4.

Figure 4:
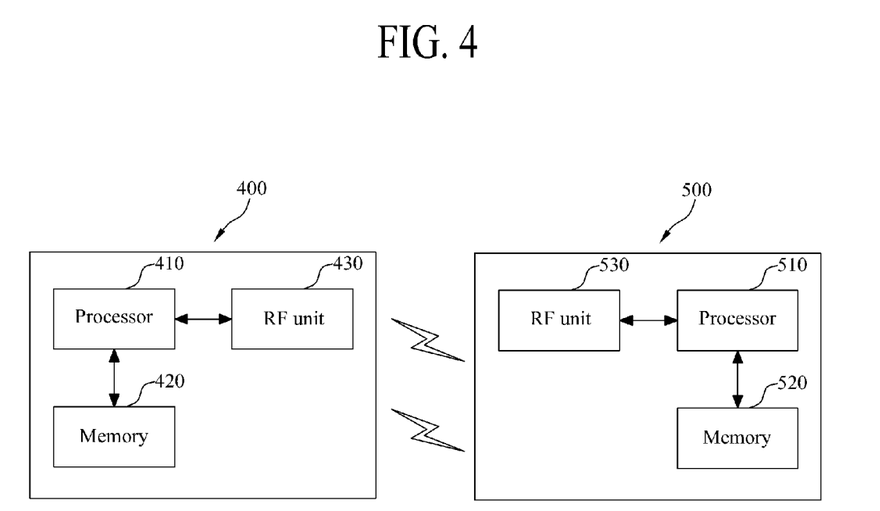
FIG. 4 is a diagram illustrating a configuration of each of a base station and a terminal according to an embodiment of the present invention.

FIG. 4 is a diagram illustrating a configuration of each of a base station and a terminal according to an embodiment of the present invention.

As illustrated in FIG. 4, a base station 400 includes a processor 410, a memory 420, and a Radio Frequency (RF) unit 430.

The processor 410 realizes the function or feature of the base station that has been described above with reference to FIG. 2. That is, the processor 410 transmits a reference signal to each terminal, and determines whether CSI is matched by using CSI (for example, a PMI) which is fed back from terminals. When it is determined that the CSI is matched, the processor 410 groups terminals (which have fed back the same CSI) as same group, selects a precoding matrix by using corresponding CSI, and precodes data, which will be transmitted to each terminal, by using the selected precoding matrix.

Moreover, when the CSI is not matched, the processor 410 generates a CSI retransmission request, and transmits the CSI retransmission request to a terminal 500 through the RF unit 430.

In addition, the processor 410 performs general functions, which are performed by a base station, such as determining a transmission mode for a terminal and scheduling.

The memory 420 is connected to the processor 410, and stores various information for driving the processor 410.

The RF unit 430 is connected to the processor 410, and transmits data to be transmitted to each terminal through a plurality of antennas or transmits the CSI retransmission request to each terminal.

Furthermore, the RF unit 430 receives data from each terminal, or receives CSI that is fed back from each terminal.

The terminal 500 includes a processor 510, a memory 520, and an RF unit 530.

The processor 510 receives the reference signal from the base station 400, and estimates a channel between the base station 400 and the terminal 500 by using the received reference signal to determine the order of CSI that the base station 400 desires to use. In an embodiment, the CSI may be a PMI, and the order of CSI that each base station desires to use may be an order in which the influence of an interference signal on each terminal decreases.

The processor 510 selects optimal first CSI according to the determined order and feeds back the selected first CSI to the base station 400. Here, the first CSI may be N number of upper PMIs that allow the influence of an interference signal to decrease.

When a CSI retransmission request is received from the base station 400 or a predetermined period arrives, the processor 510 selects second CSI (which is suboptimal CSI) from among a plurality of CSI other than the first CSI, and feeds back the second CSI to the base station 400. Here, the suboptimal second CSI may be N number of upper PMIs, which allow the influence of an interference signal to decrease, among a plurality of CSI other than the first CSI.

In addition, a plurality of wireless interface protocol layers may be implemented by the processor 510.

The memory 520 is connected to the processor 510, and stores various information for driving the processor 510.

The RF unit 530 is connected to the processor 510, and feeds back CSI to the base station 400 or transmits uplink data to the base station 400.

The RF unit 530 receives downlink data from the base station 400, and transfers the downlink data to the processor 510.

In the above description, each of the processors 410 and 510 may include an Application-Specific Integrated Circuit (ASIC), another chipset, a logic circuit, a data processing apparatus, and/or a converter that converts a baseband signal into an RF signal or converts the RF signal into the baseband signal.

Each of the memories 420 and 520 may include a Read-Only Memory (ROM), a Random Access Memory (RAM), a flash memory, a memory card, a storage medium, and/or another storage medium. Each of the RF units 430 and 530 may include one or more antennas that transmit or receive an RF signal.

When the above-described embodiments are implemented as software, the above-described technique may be implemented as a module (operation, function, etc.) that performs the above-described function. The module may be stored in the memories 420 and 520, and executed by the processors 410 and 510. The memory 420 may be disposed inside or outside the processor 410, and the memory 520 may be disposed inside or outside the processor 510. Alternatively, in various well known schemes, the memory 420 may be connected to the processor 410, and the memory 520 may be connected to the processor 510.

The above-described data transmission method in the MIMO communication system may be realized in a program command type executable in computers and stored in a computer-readable record medium. Herein, the computer-readable record medium may include a program command, a data file, and a data structure individually, or include the combination thereof. Furthermore, program commands stored in the record medium may be designed and constructed particularly for the present invention, or known to those skilled in computer software and usable.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A data transmission method in a Multi-Input Multi-Output (MIMO) communication system, the data transmission method comprising:

receiving first Channel State Information (CSI) fed back from a plurality of terminals, respectively, the first CSI being CSI between each of the terminals and a base station;

requesting feedback of second CSI from the respective terminals, the second CSI differing from the first CSI, and the second CSI being CSI between each terminal and the base station; and determining the terminals to be grouped by using at least one of the first CSI and second CSI, when the second CSI is fed back from the respective terminals, wherein in the determining of the terminals, the terminals, which have fed back the same CSI among the first CSI and the second CSI, are determined as the terminals to be grouped, and wherein each of the first CSI is N number of upper CSI in which influence of an interference signal on a corresponding terminal is minimized among all CSI usable by the terminals, and each of the second CSI is N number of upper CSI in which influence of an interference signal on a corresponding terminal is minimized among a plurality of CSI other than the first CSI.

2. The data transmission method of claim 1, wherein each of the first and second CSI comprises at least one Precoding Matrix Index (PMI).

3. The data transmission method of claim 1, further comprising determining the terminals to be grouped by using the first CSI, before the requesting feedback of the second CSI, wherein the requesting feedback of the second CSI is performed when there are no terminals to be grouped by using the first CSI.

4. The data transmission method of claim 3, wherein the terminals, which have fed back the same CSI among the first CSI fed back from the respective terminals, are determined as the terminals to be grouped when determining the terminals to be grouped by using the first CSI.

5. The data transmission method of claim 1, wherein the receiving the first CSI, the requesting feedback of the second CSI, and the determining the terminals to be grouped are repeated predetermined times or until there are terminals to be grouped.

6. A data transmission method in a Multi-Input Multi-Output (MIMO) communication system, the data transmission method comprising:
estimating a channel between a base station and a terminal;
feeding back a first Precoding Matrix Index (PMI) to the base station according to the estimated result, the first PMI being N number of upper PMIs in which influence of an interference signal is minimized among a plurality of usable PMIs; and
feeding back a second PMI to the base station according to the estimated result, the second PMI being N number of upper PMIs in which influence of an interference signal is minimized among a plurality of PMIs other than the first PMI,
wherein the terminals, which have fed back the same PMI among the first PMI and second PMI, are determined as the terminals to be grouped.

7. The data transmission method of claim 6, wherein the second PMI is fed back when a feedback request for the second PMI is received from the base station.

8. The data transmission method of claim 7, wherein the feedback request for the second PMI is received from the base station when it is determined that there are no terminals to be grouped.

9. A data transmission method in a Multi-Input Multi-Output (MIMO) communication system, the data transmission method comprising:
estimating a channel between a base station and a terminal; and
selecting a first Precoding Matrix Index (PMI) and a second PMI according to the estimated result to feed back the selected first and second PMIs to the base station when a Channel Quality Indicator (CQI) report type for the base station is one of a wideband CQI report type and a User Equipment (UE) selected subband CQI report type, the first PMI being a PMI for a channel between the terminal and the base station, and the second PMI differing from the first PMI,
wherein the terminals, which have fed back the same PMI among the first PMI and second PMI, are determined as the terminals to be grouped, and
wherein the first PMI is N number of upper PMIs in which influence of an interference signal is minimized among a plurality of PMIs usable according to the estimated result, and the second PMI is N number of upper PMIs in which influence of an interference signal is minimized among a plurality of PMIs other than the first PMI.

10. The data transmission method of claim 9, wherein the wideband CQI report type is a type in which single CQI value for an entire system band is fed back, and
the UE selected subband CQI report type is a type in which an average CQI value for a plurality of subbands selected by a terminal is fed back.

11. The data transmission method of claim 9, wherein the first and second PMIs are sequentially transmitted to the base station.

12. A data transmission apparatus in a Multi-Input Multi-Output (MIMO) communication system, the data transmission apparatus comprising:
a processor configured to estimate a channel between a base station and a terminal, and select a first Precoding Matrix Index (PMI) and a second PMI according to the estimated result when a Channel Quality Indicator (CQI) report type is a type in which single CQI value for an entire system band is fed back or a type in which an average CQI value for a plurality of subbands selected by a terminal is fed back, the first PMI being a PMI for a channel between the terminal and the base station, and the second PMI differing from the first PMI; and
an RF unit configured to transmit the first and second PMIs transferred from the processor and uplink data to the base station, or receive downlink data to transfer to the processor, the uplink data being transmitted from the terminal to the base station and the downlink data being transmitted from the base station to the terminal,
wherein the terminals, which have fed back the same PMI among the first PMI and second PMI, are determined as the terminals to be grouped, and
wherein the processor selects N number of upper PMIs in which influence of an interference signal is minimized among a plurality of usable PMIs according to the estimated result as the first PMI, and selects N number of upper PMIs in which influence of an interference signal is minimized among a plurality of PMIs other than the first PMI as the second PMI, and the RF unit sequentially transmits the first and second PMIs to the base station.

13. A data transmission apparatus in a Multi-Input Multi-Output (MIMO) communication system, the data transmission apparatus comprising:
a processor configured to determine whether Precoding Matrix Indexes (PMI) which is respectively fed back from a plurality of terminal is matched, group a plurality of terminals which have fed back the same PMI to precode downlink data to be transmitted to each of the terminals with a precoding matrix selected by using a corresponding PMI when the PMIs are matched, and generate a PMI retransmission request for each terminal when the PMI is not matched; and
an RF unit configured to receive the PMI which is fed back from each terminal, and transmit the downlink data or the PMI retransmission request to each terminal or receive uplink data from each terminal,
wherein the terminals, which have fed back the same PMI among the first PMI and second PMI, are determined as the terminals to be grouped, and
wherein the first PMI is N number of upper PMIs in which influence of an interference signal is minimized among a plurality of PMIs usable according to a estimated result between a base station and the terminal, and the second PMI is N number of upper PMIs in which influence of an interference signal is minimized among a plurality of PMIs other than the first PMI.

* * * * *